(12) United States Patent
Ferraraccio et al.

(10) Patent No.: US 10,032,530 B2
(45) Date of Patent: Jul. 24, 2018

(54) REMOTE HEAT REMOVAL SYSTEM

(71) Applicant: Westinghouse Electric Company LLC, Cranberry Township, PA (US)

(72) Inventors: Francis P. Ferraraccio, Southwick, MA (US); Nirmal K. Jain, Windsor, CT (US); Martin L. Van Haltern, Suffield, CT (US); Daniel C. Flahive, Granby, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 271 days.

(21) Appl. No.: 15/054,254

(22) Filed: Feb. 26, 2016

(65) Prior Publication Data

US 2016/0336083 A1  Nov. 17, 2016

Related U.S. Application Data

(60) Provisional application No. 62/160,665, filed on May 13, 2015.

(51) Int. Cl.
*G21C 15/18* (2006.01)
*G21D 1/04* (2006.01)
*G21D 1/02* (2006.01)
*G21D 3/04* (2006.01)

(52) U.S. Cl.
CPC ............. *G21C 15/182* (2013.01); *G21D 1/02* (2013.01); *G21D 1/04* (2013.01); *G21D 3/04* (2013.01); *Y02E 30/40* (2013.01)

(58) Field of Classification Search
CPC ..... F04D 1/02; F04D 1/06; F04D 1/10; F04D 7/08; F04D 13/04; F04C 23/00; G21C 15/182
See application file for complete search history.

(56) References Cited

U.S. PATENT DOCUMENTS

| 5,488,642 A | 1/1996 | Malik et al. |
| 2012/0250813 A1 | 10/2012 | Lloyd et al. |
| 2013/0301781 A1 | 11/2013 | Parvin et al. |

FOREIGN PATENT DOCUMENTS

| GB | 347643 A | * 4/1931 | ............... F04D 1/10 |
| JP | 2000019285 A | 1/2000 | |
| WO | 2014/137445 A2 | 9/2014 | |

OTHER PUBLICATIONS

USNRC: Reactor Concepts Manual. Pressurized Water Reactor (PWR) Systems. p. 4-2. Accession No. ML14274A090. 2014. (Year: 2014).*
International Search Report and Written Opinion of the International Searching Authority dated May 27, 2016 for PCT/US16/19694 (Forms PCT/ISA/220, PCT/ISA/210, PCT/ISA/237).

* cited by examiner

*Primary Examiner* — Jack W Keith
*Assistant Examiner* — Lily C Garner
(74) *Attorney, Agent, or Firm* — Richard J. Coldren; Westinghouse Electric Company LLC

(57) ABSTRACT

A remote heat removal system that pumps a secondary fluid from a remote reservoir through a secondary side of a heat exchanger in heat exchange relationship with a primary fluid to be cooled. The secondary fluid drives a motive device that drives the primary fluid through the primary side of the heat exchanger.

2 Claims, 1 Drawing Sheet

REMOTE HEAT REMOVAL SYSTEM

CROSS REFERENCE TO RELATED APPLICATION

This application is claims priority to U.S. Provisional Patent Application Ser. No. 62/160,665, filed May 13, 2015 entitled, REMOTE HEAT REMOVAL SYSTEM.

BACKGROUND

Conditions can arise where heat removal from an inaccessible location is required. While that type of heat removal can typically be achieved with a conventional heat exchanger, in some instances, electrical power may not be guaranteed or electrical motors may not tolerate the environment as were encountered at the Fukushima Dai-ichi nuclear plants in Japan as a result of a Tsunami. Due to contamination of an area from hazardous material or radiation, access to such areas is not always possible and a mechanism for removal of inventory from such a location is not always readily feasible. In such cases, integral, remote heat removal equipment that does not require electrical power at the hazardous site and does not require local human intervention is beneficial.

An example of such a condition, though unlikely, is a severe accident at a nuclear plant site resulting in damage within the reactor containment building in which the primary system of the reactor is breached and the nuclear fuel is severely damaged. In such a case, highly contaminated reactor coolant and design safety injection inventory leaking from the primary system would be collected within the reactor containment building. The heat developed from the radioactive decay of the nuclear fuel material must be removed from the containment to control the pressure and temperature within the building. Traditionally designed plant heat removal systems cannot be used to cool the flooded inventory and the highly contaminated inventory associated with a severe accident cannot be circulated outside the containment building. This invention will provide a means for cooling the inventory spilled within the reactor containment building even in the event of the loss of site power, while maintaining separation between the contaminated inventory and the clean inventory used to cool the contaminated inventory and will not circulate the contaminated inventory outside the containment building.

SUMMARY

To accomplish the foregoing objective this invention provides a remote heat removal system for removing heat, from a first fluid maintained in a hazardous environment, such as a reactor containment building or a spent nuclear fuel building. Generally, in accordance with this invention a heat exchanger is positioned within the contained hazardous environment within proximity to a first fluid, such as the reactor coolant within the containment. The heat exchanger has a primary side in heat exchange relationship with a secondary side with the first fluid in fluid communication with the primary side. A remote reservoir is located outside of the hazardous environment and contains a second fluid, at a temperature below a temperature of the first fluid, with the second fluid in fluid communication with the secondary side of the heat exchanger. A pump is positioned outside of the hazardous environment to drive the second fluid through the secondary side of the heat exchanger. The system further includes a hydraulic fluid transport mechanism that has a first section in fluid communication with the second fluid and a second section in fluid communication with the first fluid, i.e., the reactor coolant within the containment, with the first section fluidly isolated from the second section and configured to have the second fluid drive a pump, which drives the first fluid through the second section.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
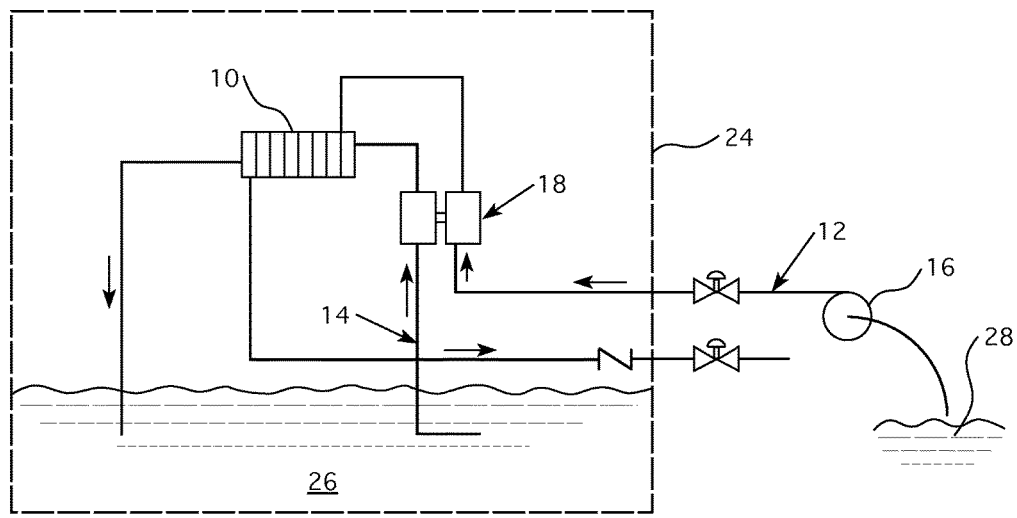
FIG. 1 is a schematic view of one embodiment of this invention.
Figure 2:
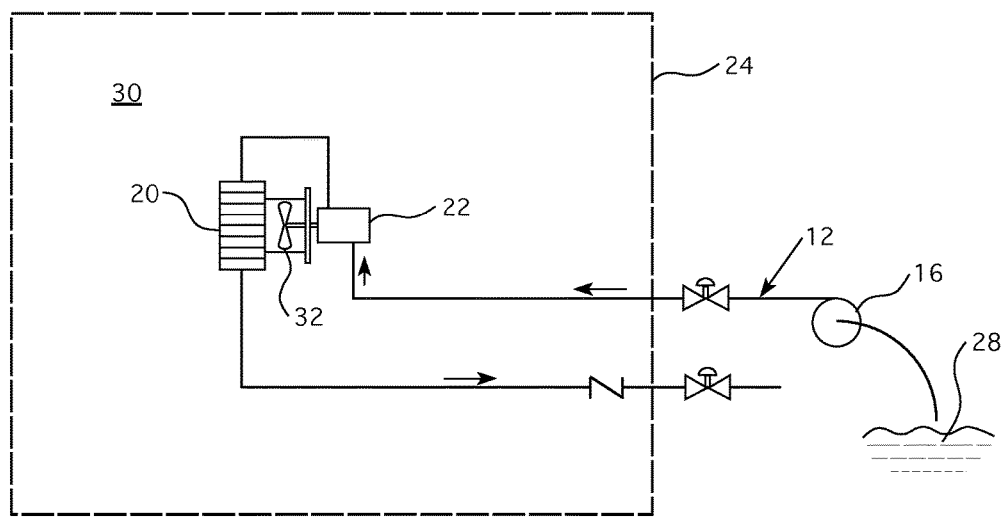
FIG. 2 is a schematic view of a second embodiment of this invention.

Two embodiments of the foregoing invention are illustrated in FIGS. 1 and 2. In FIG. 1, a typical liquid-to-liquid heat exchanger 10 is used to transfer heat between the primary loop 14 and a secondary loop 12. For example, the primary loop may be connected to the reactor coolant 26 within the hazardous environment, in this example a nuclear containment, while the secondary loop is connected to a remote cooling pond 28. However, it should be appreciated that this invention is applicable to any hazardous environment from which it is necessary or desirable to remove heat while containing the environment.

The heat exchanger may be any one of a plurality of designs such as the plate design, tube and shell design or tube within a tube design. The heat absorbing inventory in the secondary loop 12, for example, from a cooling pond, is circulated into the heat exchanger by a remote, conventionally driven pump 16, outside the hazardous environment. The pump 16 drives inventory first through a twin impeller, single shaft pump 18 then continues, for example, to the secondary side of the heat exchanger 10; then exits the hazardous area, schematically represented by the dotted lines 24, for discharge or cooling for return cycles. The pump 18, which is driven by the secondary inventory, in this example, a coolant from the cooling pond, draws hot contaminated inventory using the second impeller and drives the contaminated inventory through the primary side of the heat exchanger 10. After being circulated through the primary side of the heat exchanger, the inventory returns to the contaminated pool within the hazardous area. In this configuration heat is removed from the hazardous environment without the inventory having to leave the area.

FIG. 2 shows a second embodiment that employs a typical liquid-to-air heat exchanger 20 that has a secondary coolant loop 12 that is used to circulate a second coolant, which is the heat absorbing inventory, such as water from the cooling pond, through the heat exchanger. It should be noted that like reference characters have been employed in FIGS. 1 and 2 to designate corresponding components. The heat absorbing inventory 12 is circulated into the heat exchanger by a remote pump 16, as explained above. The pump 16 in this embodiment drives the heat absorbing inventory, first through a hydraulic motor 22, then continues to the heat exchanger liquid tubes within the heat exchanger 20; then exits the hazardous area 24 for discharge or cooling for return cycles. The motor 22 which is driven by the heat absorbing inventory, drives a fan 32 that circulates air 30 across fins around the secondary tubing of the heat exchanger 20 through which the heat absorbing inventory is pumped. In this way, the air within the hazardous environment can be cooled without the need for electricity within proximity of the hazardous environment.

Thus, this invention provides remote heat removal from a contaminated or radioactive location without electrical or electronic support within proximity of the contaminated area. Since no electrical devices are required within the vicinity of the hazardous environment explosive gases within the hazardous environment are not likely to be set off by a spark that might otherwise be generated by electrical equipment such as an electrically driven pump.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A remote heat removal system for removing heat from a first fluid maintained in a hazardous environment, comprising:
   a heat exchanger positioned within the hazardous environment within proximity to the first fluid, the heat exchanger having a primary side in heat exchange relationship with a secondary side with the first fluid in fluid communication with the primary side;
   a remote reservoir located outside of the hazardous environment, containing a second fluid at a temperature below a temperature of the first fluid, with the second fluid in fluid communication with the secondary side of the heat exchanger;
   a first pump operable to drive at least a portion of the second fluid through the secondary side of the heat exchanger, with the first pump positioned outside of the hazardous environment;
   a hydraulic fluid transport mechanism having a first section in fluid communication with the second fluid and a second section in fluid communication with the first fluid, with the first section fluidly isolated from the second section, the first section being configured to have the second fluid drive a second pump, which drives the first fluid through the second section; and
   wherein the hydraulic fluid transport mechanism comprises the second pump having a first impeller located in the first section that is driven by the second fluid and a second impeller located in the second section that is driven by the first impeller and in turn drives the first fluid over the secondary side of the heat exchanger.

2. The remote heat removal system of claim 1 wherein the first fluid is a gas and the second impeller is a fan that drives the first fluid over the secondary side of the heat exchanger.

* * * * *